United States Patent
Lommen (10) Patent No.: US 11,202,410 B2
(45) Date of Patent: Dec. 21, 2021

(54) LIGHT-EMITTING MECHANISM ON CROP DIVIDER ROD OF HARVESTING HEADER

(71) Applicant: DEERE & COMPANY, Moline, IL (US)

(72) Inventor: Matthew Lommen, Bettendorf, IA (US)

(73) Assignee: DEERE & COMPANY, Moline, IL (US)

( * ) Notice: Subject to any disclaimer, the term of this patent is extended or adjusted under 35 U.S.C. 154(b) by 205 days.

(21) Appl. No.: 16/398,562

(22) Filed: Apr. 30, 2019

(65) Prior Publication Data
US 2020/0344954 A1   Nov. 5, 2020

(51) Int. Cl.
*A01D 75/00*   (2006.01)
*A01D 57/02*   (2006.01)
*A01D 63/04*   (2006.01)

(52) U.S. Cl.
CPC .............. *A01D 63/04* (2013.01); *A01D 57/02* (2013.01); *A01D 75/00* (2013.01)

(58) Field of Classification Search
CPC ........ A01D 75/00; A01D 57/02; A01D 63/04; A01D 63/02; A01D 63/00; A01D 45/021; A01D 41/127; A01D 45/001; A01D 46/243; A01D 44/00; A01D 44/02; B60Q 1/04
See application file for complete search history.

(56) References Cited

U.S. PATENT DOCUMENTS

| | | | | |
|---|---|---|---|---|
| 1,684,561 A | * | 9/1928 | Sullivan | A01D 45/021 56/77 |
| 3,596,448 A | * | 8/1971 | Van Buskirk | A01D 45/021 56/63 |
| 3,695,015 A | * | 10/1972 | Twidale | A01D 57/28 56/181 |
| 4,502,270 A | * | 3/1985 | Shupert | A01D 45/021 56/119 |
| 4,507,910 A | * | 4/1985 | Thornley | A01D 41/141 56/10.2 E |

(Continued)

FOREIGN PATENT DOCUMENTS

| | | | | |
|---|---|---|---|---|
| DE | 19743884 A1 | | 7/1978 | |
| DE | 102010028687 A1 | * | 11/2011 | ............. A01D 45/02 |

(Continued)

OTHER PUBLICATIONS https://www.claasofamerica.com/product/combines2017/headers/swath-up, 2017, CLAAS.

(Continued)

*Primary Examiner* — Alicia Torres
*Assistant Examiner* — Madeline Ivy Runco
(74) *Attorney, Agent, or Firm* — Taft Stettinius & Hollister LLP; Stephen F. Rost (57) ABSTRACT

A crop divider assembly for a harvesting header includes a housing defining an interior cavity and including a forwardmost end. A divider rod has a first end and a second end, where the first end is coupled to the forwardmost end of the housing. A light-emitting mechanism is coupled to the second end of the divider rod. The divider rod extends upwardly from the forwardmost end, and the light-emitting mechanism is positioned at a location above the forwardmost end of the housing.

18 Claims, 5 Drawing Sheets

(56) References Cited

U.S. PATENT DOCUMENTS

| | | | | |
|---|---|---|---|---|
| 5,155,984 | A * | 10/1992 | Sheehan | A01D 41/141 56/10.2 E |
| 6,397,569 | B1 * | 6/2002 | Homburg | A01D 41/1278 56/10.2 F |
| 6,483,583 | B1 * | 11/2002 | Wright | G01J 3/02 356/326 |
| 6,651,411 | B1 * | 11/2003 | Becker | A01D 57/04 56/10.2 A |
| 6,791,488 | B2 * | 9/2004 | Diekhans | A01D 41/127 342/118 |
| 6,826,894 | B2 * | 12/2004 | Thiemann | A01D 41/141 56/10.2 E |
| 7,377,091 | B2 * | 5/2008 | Shelton | A01D 45/021 56/119 |
| 8,726,621 | B2 * | 5/2014 | Ritter | A01D 41/141 56/10.2 E |
| 9,220,195 | B2 * | 12/2015 | Eggenhaus | A01D 41/1243 |
| 9,585,309 | B2 * | 3/2017 | Posselius | A01D 41/141 |
| 9,807,938 | B2 * | 11/2017 | Wilken | G05B 17/02 |
| 9,849,828 | B2 * | 12/2017 | Foster | G07C 5/0825 |
| 9,980,431 | B2 * | 5/2018 | Long | A01D 41/141 |
| 10,225,984 | B2 * | 3/2019 | Slichter | G01S 17/42 |
| 10,278,375 | B2 * | 5/2019 | Saue | A01K 79/02 |
| 2006/0101797 | A1 * | 5/2006 | Plender | A01D 46/30 56/1 |
| 2006/0268549 | A1 * | 11/2006 | Oehlke | F21S 41/151 362/276 |
| 2008/0247153 | A1 * | 10/2008 | Groover | G01F 23/292 362/23.1 |
| 2010/0050588 | A1 * | 3/2010 | Ramirez | A01D 46/243 56/330 |
| 2014/0331629 | A1 * | 11/2014 | Dagorret | A01D 46/20 56/10.1 |
| 2015/0253427 | A1 * | 9/2015 | Slichter | A01B 69/007 356/5.01 |
| 2016/0278290 | A1 * | 9/2016 | Vandergucht | A01D 57/02 |
| 2017/0055453 | A1 * | 3/2017 | Shoup | A01D 57/02 |
| 2017/0086374 | A1 * | 3/2017 | Engel | H05B 45/00 |
| 2018/0347803 | A1 * | 12/2018 | Dimsey | F21V 21/14 |
| 2019/0003698 | A1 * | 1/2019 | Kimura | F21V 33/00 |
| 2021/0137006 | A1 * | 5/2021 | Shearer | A01D 57/02 |

FOREIGN PATENT DOCUMENTS

| | | | | |
|---|---|---|---|---|
| DE | 102010028687 | B4 * | 10/2014 | A01D 45/02 |
| DE | 102015104928 | A1 | 10/2016 | |
| DE | 102016202628 | A1 * | 8/2017 | A01D 41/127 |
| EP | 3747253 | A1 * | 12/2020 | A01D 34/86 |

OTHER PUBLICATIONS https://www.claasofamerica.com/product/combines2017/headers/convio-flex, 2017, CLAAS.

https://www.claas-group.com/press-corporate-communications/press-releases/claas-improves-profitability-with-increasing-revenue-/1904264.

https://www.macdon.com/en/products/d65-draper-headers-for-combine/, MacDon Industries, 2017.

https://agriculture.newholland.com/nar/en-us/equipment/products/combines-and-headers/corn-heads, New Holland.

https://agriculture.newholland.com/nar/en-us/equipment/products/combines-and-headers/draper-heads.

https://www.caseih.com/northamerica/en-us/products/harvesting/draper-beads, Case IH.

http://www.masseyferguson.us/products/combine-harvesting/9250-dynaflex-draper-headers.html#0, AGCO Corp.

* cited by examiner

LIGHT-EMITTING MECHANISM ON CROP DIVIDER ROD OF HARVESTING HEADER

FIELD OF THE DISCLOSURE

The present disclosure relates to a harvesting machine, and in particular, to a light-emitting mechanism for aligning the harvesting machine in a field.

BACKGROUND

Agricultural machines, such as a combine, may operate and harvest crops at different times during a given day. This can include at dusk or later when it becomes more difficult for the operator to see far in front of the machine. It is particularly more difficult for an operator to see to either side of the machine, especially when the machine includes an implement such as a harvesting header or draper head that has a significant lateral width. At dusk, it can be challenging for the operator to align the machine and the header with the rows of crop in the field.

Thus, there is a need for a light-emitting mechanism located on the harvesting header at a location that can be seen by an operator from a cab of the agricultural machine and assists with aligning the header in the field.

SUMMARY

In one embodiment of the present disclosure, a crop divider assembly for a harvesting header includes a housing defining an interior cavity, the housing comprising a forwardmost end; a divider rod comprising a first end and a second end, the first end being coupled to the forwardmost end of the housing; and a light-emitting mechanism coupled to the second end of the divider rod; wherein, the divider rod extends upwardly from the forwardmost end; further wherein, the light-emitting mechanism is positioned at a location above the forwardmost end of the housing.

In one example of this embodiment, the light-emitting mechanism is angularly oriented in a partially upward and rearward direction. In a second example, the divider rod comprises a first portion and a second portion, the first portion being located outside of the interior cavity and the second portion being located inside the interior cavity. In a third example, the first portion comprises a length defined between the first end and the second end. In a fourth example, the divider rod comprises a hollow tube.

In a fifth example, an electrical wire and an electrical connector are provided such that the electrical wire is coupled between the light-emitting mechanism and the electrical connector for transmitting electricity to the light-emitting mechanism; wherein the electrical wire is disposed within the hollow tube. In a sixth example, the divider rod comprises an elongated tube including a first section, a second section, a third section, a first bend, and a second bend; wherein, the first section is defined between the first end and the first bend, the first section extending in a forward and upward direction; wherein, the second section is defined between the first bend and the second bend, the second section extending in a generally upward direction; wherein, the third section is defined between the second bend and the second end, the third section extending in a rearward and upward direction.

In a seventh example, the light-emitting mechanism comprises a bulb or light-emitting diode for emitting a blue, red, or green light. In an eighth example, the light-emitting mechanism is located approximately one meter or less above the forwardmost end.

In another embodiment of the present disclosure, a harvesting header for mounting to a combine includes a frame having a first end and a second end, the frame comprising a lateral width defined between the first end and the second; a cutting mechanism for severing crop, the cutting mechanism coupled to the frame; a crop divider assembly coupled at the first end of the frame, the crop divider assembly comprising a housing defining an interior cavity, the housing including a forwardmost end; a divider rod comprising a first end and a second end, the first end being coupled to the forwardmost end of the housing; and a light-emitting mechanism coupled to the second end of the divider rod; wherein, the divider rod extends upwardly from the forwardmost end; further wherein, the light-emitting mechanism is positioned at a location above the forwardmost end of the housing.

In one example of this embodiment, the light-emitting mechanism is oriented in an upward and rearward direction. In a second example, the divider rod comprises a first portion and a second portion, the first portion being located outside of the interior cavity and the second portion being located inside the interior cavity. In a third example, the first portion comprises a length defined between the first end and the second end. In a fourth example, the divider rod comprises a hollow tube.

In another example, an electrical wire and an electrical connector may be provided such that the electrical wire is coupled between the light-emitting mechanism and the electrical connector for transmitting electricity to the light-emitting mechanism; wherein the electrical wire is disposed within the hollow tube. In a further example, a second crop divider assembly is coupled at the second end of the frame, the second crop divider assembly comprising a housing defining an interior cavity and including a forwardmost end; a second divider rod comprising a first end and a second end, the first end being coupled to the forwardmost end of the housing of the second crop divider assembly; and a second light-emitting mechanism coupled to the second end of the second divider rod; wherein, the second divider rod extends upwardly from the forwardmost end; further wherein, the light-emitting mechanism is positioned at a location above the forwardmost end of the housing. In yet another example, the second light-emitting mechanism is oriented in an upward and rearward direction.

In a further embodiment of the present disclosure, an agricultural machine for harvesting crop includes a chassis; a ground-engaging mechanism for supporting the chassis and for propelling the machine along a ground surface; a cab mounted to the chassis, the cab including at least one control device for controlling the machine; a harvesting header mounted to a front end of the chassis, the harvesting header including a frame having a lateral width defined between a first lateral end and a second lateral end; a reel rotatably coupled to the frame for collecting severed crop; a crop divider assembly coupled at the first lateral end of the frame, the crop divider assembly comprising a housing defining an interior cavity, the housing including a forwardmost end; a divider rod comprising a first end and a second end, the first end being coupled to the forwardmost end of the housing, wherein the divider rod extends upwardly from the forwardmost end; and a light-emitting mechanism coupled to the second end of the divider rod; wherein, the light-emitting mechanism is positioned at a location above the forwardmost end of the housing.

In one example of this embodiment, the light-emitting mechanism is oriented at least partially rearwardly in a direction towards the cab, the light-emitting mechanism being positioned at a location visible from the cab without being obstructed by the reel. In another example, a second crop divider assembly is coupled at the second end of the frame, the second crop divider assembly comprising a housing defining an interior cavity and including a forwardmost end; a second divider rod comprising a first end and a second end, the first end being coupled to the forwardmost end of the housing of the second crop divider assembly; and a second light-emitting mechanism coupled to the second end of the second divider rod; wherein, the second divider rod extends upwardly from the forwardmost end; further wherein, the light-emitting mechanism is positioned at a location above the forwardmost end of the housing.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

Figure 1:
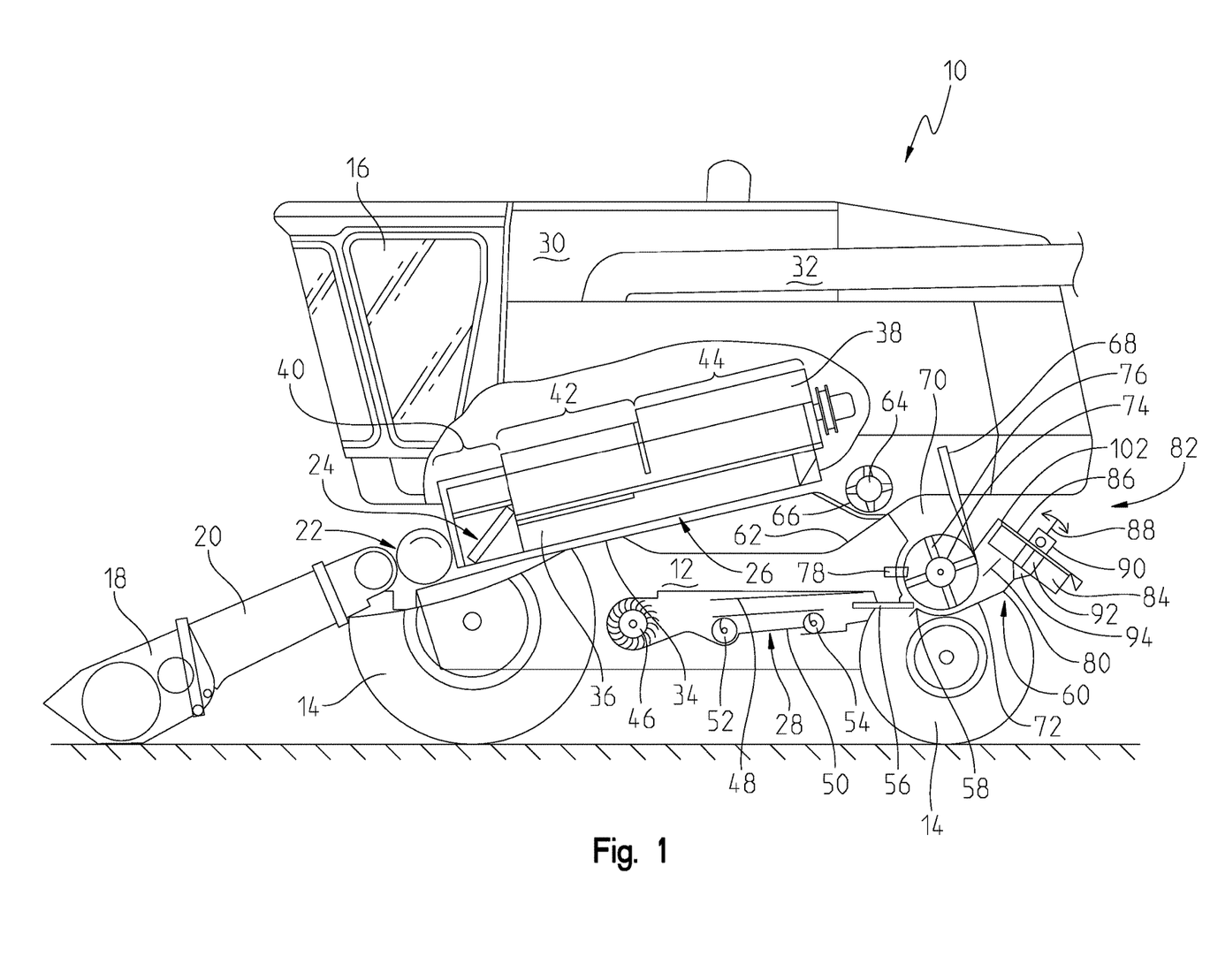
FIG. 1 is a partial section of a side view of an agricultural machine for harvesting crop.

In FIG. 1, an embodiment of an agricultural combine 10 is shown with a chassis 12 with wheels 14 in contact with the ground. Wheels 14 are coupled to the chassis 12 and are used for a forward propulsion of the combine 10 in a forward operating or travelling direction. The forward operating direction is to the left in FIG. 1. The operation of the combine 10 is controlled from an operator's cab 16. The operator's cab 16 may include any number of controls (not shown) for controlling the operation of the combine 10. A cutter head 18 is disposed at a forward end of the combine 10 and is used in order to harvest crop such as corn and to conduct it to a slope conveyor 20. The harvested crop is conducted by a guide drum 22 to a slope conveyor 20. The guide drum 22 guides the harvested crop through an inlet transition section 24 to an axial harvested crop processing arrangement 26, as shown in FIG. 1.

The harvested crop processing arrangement 26 may include a rotor housing 34 and a rotor 36 arranged therein. The rotor 36 includes a hollow drum 38 to which crop processing elements are fastened for a charging section 40, a threshing section 42, and a separating section 44. The charging section 40 is arranged at the front end of the axial harvested crop processing arrangement 26. The threshing section 42 and the separating section 44 are located downstream in the longitudinal direction and to the rear of the charging section 40. The drum 38 may be in the form of a truncated cone located in the charging section 40. The threshing section 42 may include a forward section in the form of a truncated cone and a cylindrical rear section. The cylindrical separating section 44 of the drum 38 is located at the rear or end of the axial harvested crop processing unit 26. In place of the axial harvested crop processing unit 26, a tangential threshing drum with a following axial threshing section or a straw chopper could also be used.

Corn and chaff that fall through a thresher basket associated with the threshing section 42 and through a separating grate associated with the separating section 44 may be directed to a cleaning system 28 with a blower 46 and sieves 48, 50 with louvers. The sieves 48, 50 can be oscillated in a fore-and-aft direction. The cleaning system 28 removes the chaff and guides the clean corn over a screw conveyor 52 to an elevator for clean corn (not shown). The elevator for clean corn deposits the clean corn in a corn tank 30, as shown in FIG. 1. The clean corn in the corn tank 30 can be unloaded by means of an unloading screw conveyor 32 to a corn wagon, trailer, or truck (not shown). Harvested crop remaining at the lower end of the lower sieve 50 is again transported to the harvested crop processing arrangement 26 by a screw conveyor 54 and an overhead conveyor (not shown). The harvested crop residue delivered at the upper end of the upper sieve 48 that consist essentially of chaff and small straw particles may be conveyed by means of an oscillating sheet conveyor 56 to the rear and to a lower inlet 58 of a chopper rotor assembly 60.

The aforementioned blower 46 produces an air flow that carries much of the chaff and small particles to the rear of the combine and to the chopper rotor assembly 60. The blower 46 is capable of providing three or more air paths inside the combine. A first air or flow path may be through a front portion of the combine 10. A second air or flow path may be above the lower sieve 50 and below the upper sieve 48 or chaffer. A third air or flow path may be below the lower sieve 50. All three air or flow paths fill the combine body and can create pressurized air flow to pick up and carry straw, grain, and other residue or particles to the rear of the combine 10.

Threshed-out straw leaving the separating section 44 is ejected through an outlet 62 from the harvested crop processing arrangement 26 and conducted to an ejection drum 64. The ejection drum 64, or discharge beater, interacts with a sheet 66 arranged underneath it to eject the straw to the rear, and the grain and MOG is directed through the cleaning system 28. A wall 68 is located to the rear of the ejection drum 64. The wall 68 guides the straw into an upper inlet 70 of the chopper rotor assembly 60.

The chopper rotor assembly 60 may include a housing 72 (i.e., chopper housing) with a rotor 74 arranged therein that can rotate in a counterclockwise direction about an axis extending horizontally and transverse to the direction of operation. The rotor 74 may include a plurality of chopper knives 76, pendulously suspended in pairs and distributed around the circumference of the rotor 74, that interact with opposing knives 78, which are fixed to the housing 72. Two impeller blowers 82 arranged side by side alongside each other, may be provided downstream of an outlet 80 of the chopper rotor assembly 60. Only a single blower 82 is shown in FIG. 1. The impeller blowers 82 may include a number of impeller blades 84, each of which is connected rigidly to an upper circular disk 86, that can rotate about central axes 88. The disks 86 with the impeller blades 84 that extend radially can be rotatably driven by a hydraulic motor 90 that is attached above a bottom sheet 102 which is connected with the housing 72 of the chopper rotor assembly 60. At their radially inner ends the impeller blades 84 are connected to a cylindrical central body 92 that transitions into a cone 94 with a point on its end facing away from the disk 86. The impeller blades 84 may be rectangular and the height of the body 92 (without cone 94) may be equal to the height of the impeller blades 84. The cross section of the body 92 and the cone 94 may be circular, although it could also have a multifaceted shape.

Figure 2:
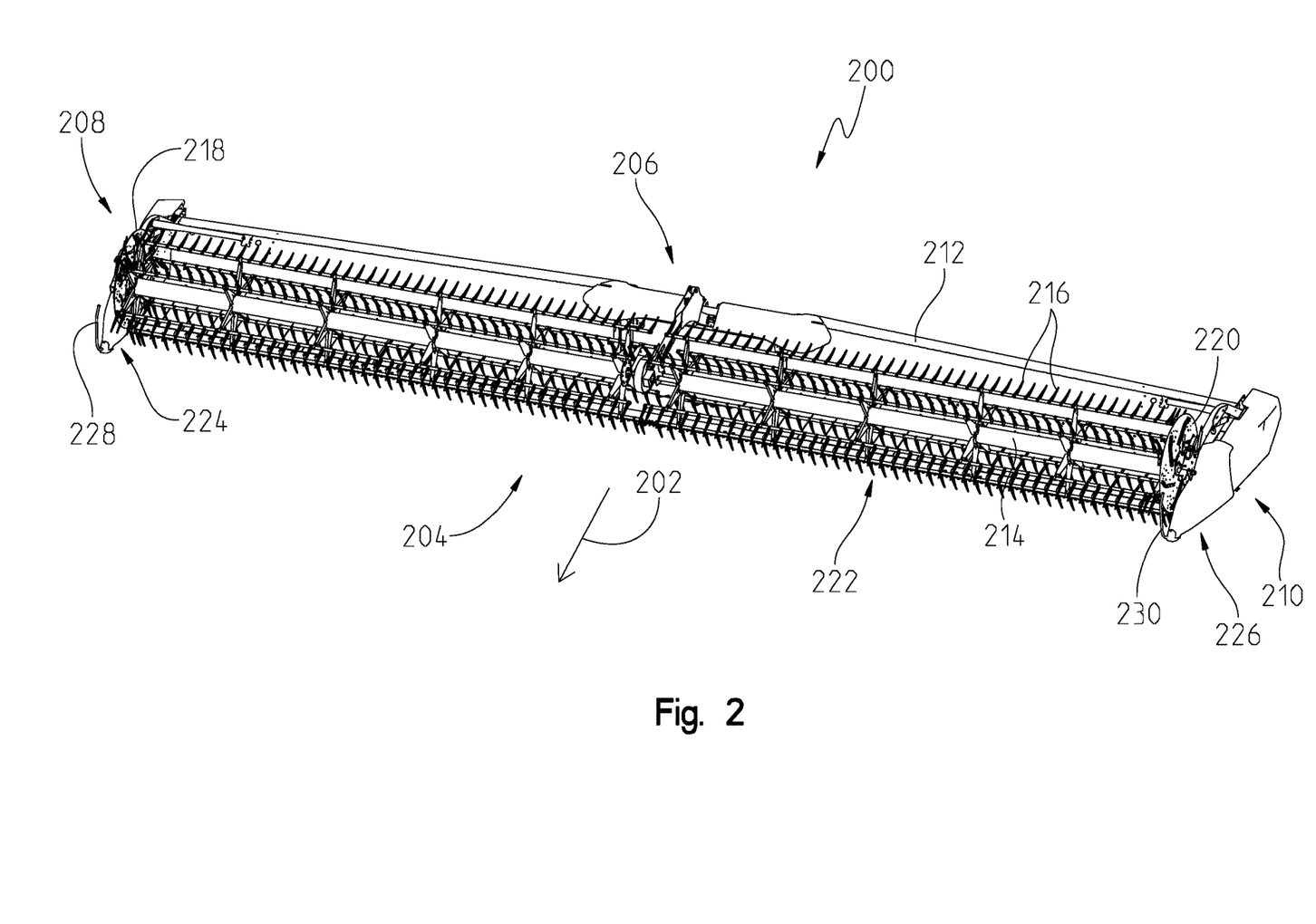
FIG. 2 is a front perspective view of a harvesting header with a crop divider assembly including a light-emitting mechanism.

Referring to FIG. 2, a harvesting header 200 is illustrated. The harvesting header 200 may be mounted to an agricultural machine such as the combine harvester 10 of FIG. 1. In one example, the harvesting header 200 may take the form of a draper header that moves in a forward travel direction 202 through a field and harvests corn or other crop. The harvesting header 200 includes a frame 212 having a front end 204, a rear end 206, a first side 208 and a second side 210, as shown in FIG. 2. A lateral width of the harvesting header is defined between the first side 208 and the second side 210.

The harvesting header 200 may include a cutting mechanism in the form of a cutter bar 222 for cutting or severing crop. The cutter bar 222 may include a plurality of knives that are reciprocally driven by a conventional drive mechanism (not shown) for severing the crop. The cutter bar 222 is located at a forward end of the harvesting header 200.

The harvesting header 200 may also include a reel 214 or other conventional pick-up mechanism for collecting or directing crop rearward once it is severed. The reel 214 may be rotatably driven and include a plurality of tines 216 for collecting the severed crop. As shown, the reel 214 may include a first wheel 218 and a second wheel 220, where the first wheel 218 is located at the first side 208 of the header and the second wheel 220 is located at the second side 210 thereof. The plurality of tines 216 may be rotatably driven as the first and second wheels rotate about a rotation axis.

At each end, the harvesting header 200 may also include a crop divider assembly. In FIG. 2, a first crop divider assembly 224 is located at the first side 208 of the header and a second crop divider assembly 226 is located at the second side 210 thereof. The crop divider assemblies are located at the outer ends of the harvesting header 200 and are configured to guide crop inwardly to be severed by the cutter bar 222. The first crop divider assembly 224 is shown having a first crop divider rod 228, and the second crop divider assembly 226 is shown having a second crop divider rod 230.

In conventional harvesting applications, an operator may operate the agricultural machine at dusk or later when natural lighting is unavailable. Thus, the machine may include conventional field lights that may project lighting around the machine or in front thereof. With the field lights, however, it is difficult for an operator to see the entire width of the harvesting header. As a result, the operator is often challenged to properly align the lateral-most edges (i.e., the first side 208 and second side 210) of the harvesting header with the rows of crop in the field. This is particularly challenging when the operator is unable to see the far lateral edges of the header. To make matters more difficult, different structural components of the header such as the reel obstruct or block any lighting that is otherwise disposed towards the outer ends of the header.

Figure 3:
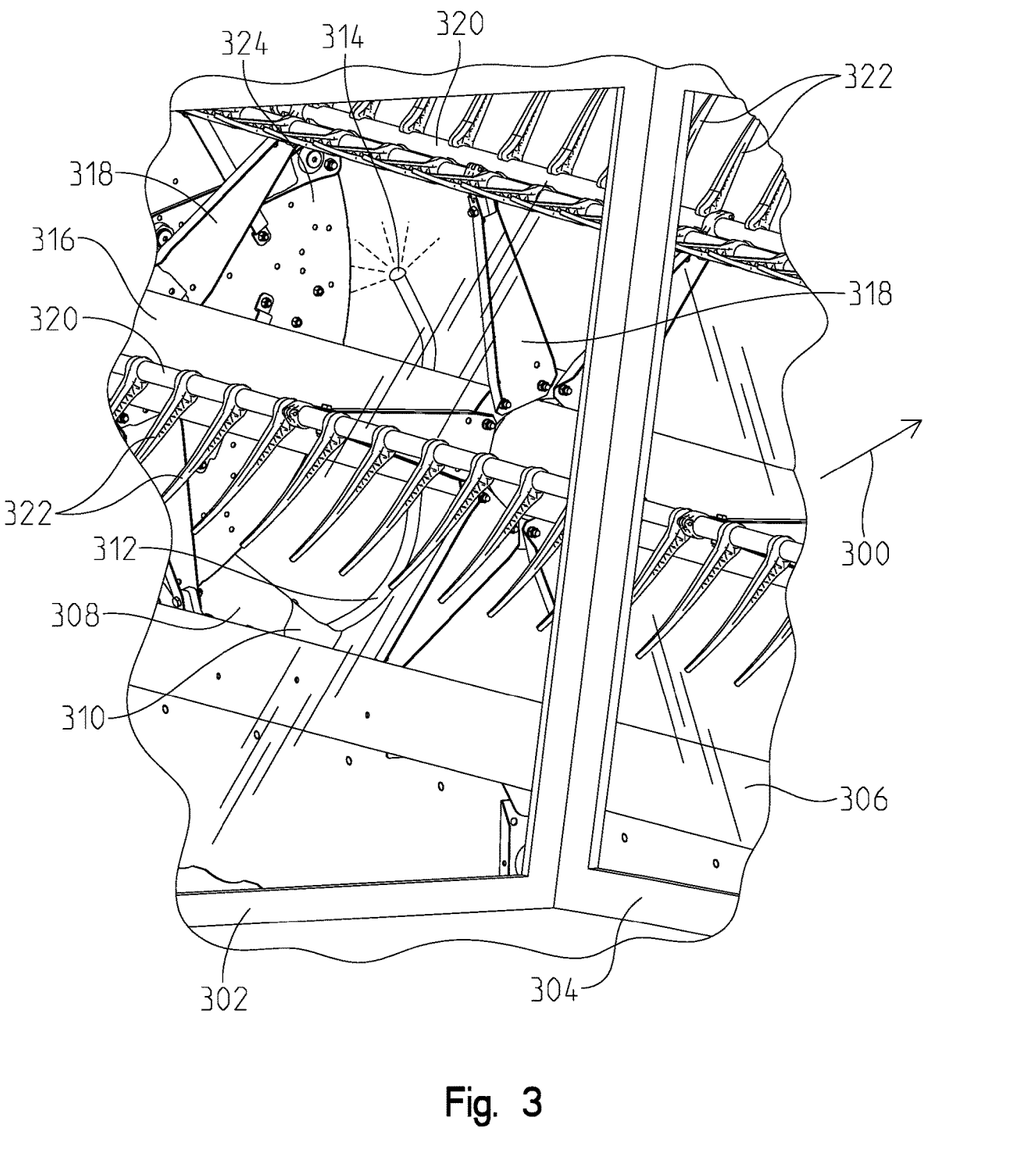
FIG. 3 is a partial perspective view of a light-emitting mechanism located on a crop divider assembly from a cab of an agricultural machine.

To address these challenges, the present disclosure seeks to add a light-emitting device to one end of the crop divider rod at the end of the harvesting header. The light-emitting device may be oriented in such a way that it is directs light rearwardly and upwardly towards the operator who is located in the cab of the machine. An example of this is shown in FIG. 3. Here, a view is provided from an operator's seat of an agricultural machine travelling in a forward travel direction 300. The cab may include a first cab window 302 and a second cab window 304. When looking out the first cab window 302, for example, the operator is able to look to one side of a harvesting header.

The harvesting header may be similar to the one shown in FIG. 2. The harvesting header may include a frame 306 with a pick-up reel rotatably coupled thereto. The reel may be similar to the reel 214 shown in FIG. 2 and includes an elongated reel drum 316 with a plurality of spoke-like structures 318 projecting radially therefrom. Tine rods 320 may be coupled to the spoke-like structures 318, and a plurality of tines 322 may be coupled to each tine rod 320. The plurality of tines 322 may be similar in design and function as the tines 216 in FIG. 2. The reel drum 316 may be mounted between a pair of reel wheels 324, which may be similar to the first reel wheel 218 and second reel wheel 220 of FIG. 2. During a harvesting operation, the reel may be rotatably driven to collect and direct crop rearward towards the agricultural machine.

As shown in FIG. 3, a portion of a crop divider assembly 308 may be seen from the cab. The crop divider assembly 308 may include a divider shoe 310 which is coupled at a front tip of the assembly 308. The divider shoe 310 defines a forwardmost tip or edge of the crop divider assembly 308. A divider rod 312 is also visible from the cab through the first cab window 302, although a portion of the divider rod 312 is blocked by the reel. In any event, the divider rod 312 may be coupled to the forwardmost edge or tip of the crop divider assembly 308, as shown.

As also shown in FIG. 3, a light-emitting mechanism 314 is shown illuminated. The light-emitting mechanism 314 may be coupled to an end of the divider rod 312. The light-emitting mechanism 314 is located above the ground and is oriented at least partially rearward so that the operator can see the light-emitting mechanism 314 from the cab. Moreover, the light being emitted by the mechanism 314 is not being projected forwardly which in some cases may deceive the operator as to the alignment of the header with the rows of crop. Further, as the header traverses through the field in the forward travel direction 300, the light-emitting mechanism 314 is not the first structural piece to engage the crop, but rather the divider rod 312 does.

Although only one end of the harvesting header is shown, it is to be understood that in a related embodiment a similar divider rod and light-emitting mechanism may be located at the opposite end thereof. In this related embodiment, an operator will visually be able to detect the lateral ends of the harvesting header via the light-emitting devices 314.

Another feature of the light-emitting mechanism 314 is its placement relative to the crop divider assembly 308 and the ground. The divider rod 308 may extend upwardly by a distance of one meter from the ground, in one example. The length of the rod may vary, and in some instances it may be less than or greater than one meter. In any event, the rod 308 extends far enough above the ground and the crop divider assembly 308 that the light-emitting mechanism 314 is visible when harvesting wheat, beans or other smaller grains. Thus, the present disclosure provides a light-emitting mechanism 314 that is visible to the operator from the cab of the agricultural machine regardless of the size or type of crop being harvested.

The light-emitting mechanism 314 is also positioned out in front of the cab and the crop divider assembly 308. Therefore, in addition to its positioning above the ground by at least one foot or more, the light-emitting mechanism 314 is located forwardly of the harvesting header to allow the operator to better align the ends of the frame 308 with the rows of crop.

The light-emitting mechanism 314 may include a light-emitting diode. In other examples, the light-emitting mechanism 314 may take the form of any other conventional type of light-emitting device. The mechanism 314 may include a bulb or light-emitting diode that receives electrical power from a power source (not shown). In one embodiment, the light-emitting mechanism 314 may emit a specific color of light. For example, the mechanism 314 may emit a blue, red or green light when illuminated. Other colors are possible that provide easy visibility and detection from the cab.

The light-emitting mechanism 314 may be operably controlled by the operator from the cab using one of a plurality of controls in the cab. In one example, the light-emitting mechanism 314 may be turned on when conventional field lights are turned on. In another example, a dusk-dawn sensor may trigger the light-emitting mechanism 314. A timer may be set at which the light-emitting mechanism 314 is triggered on. Other sensors or control features may be utilized for controlling the light-emitting mechanism to be turned on or off.

Figure 4:
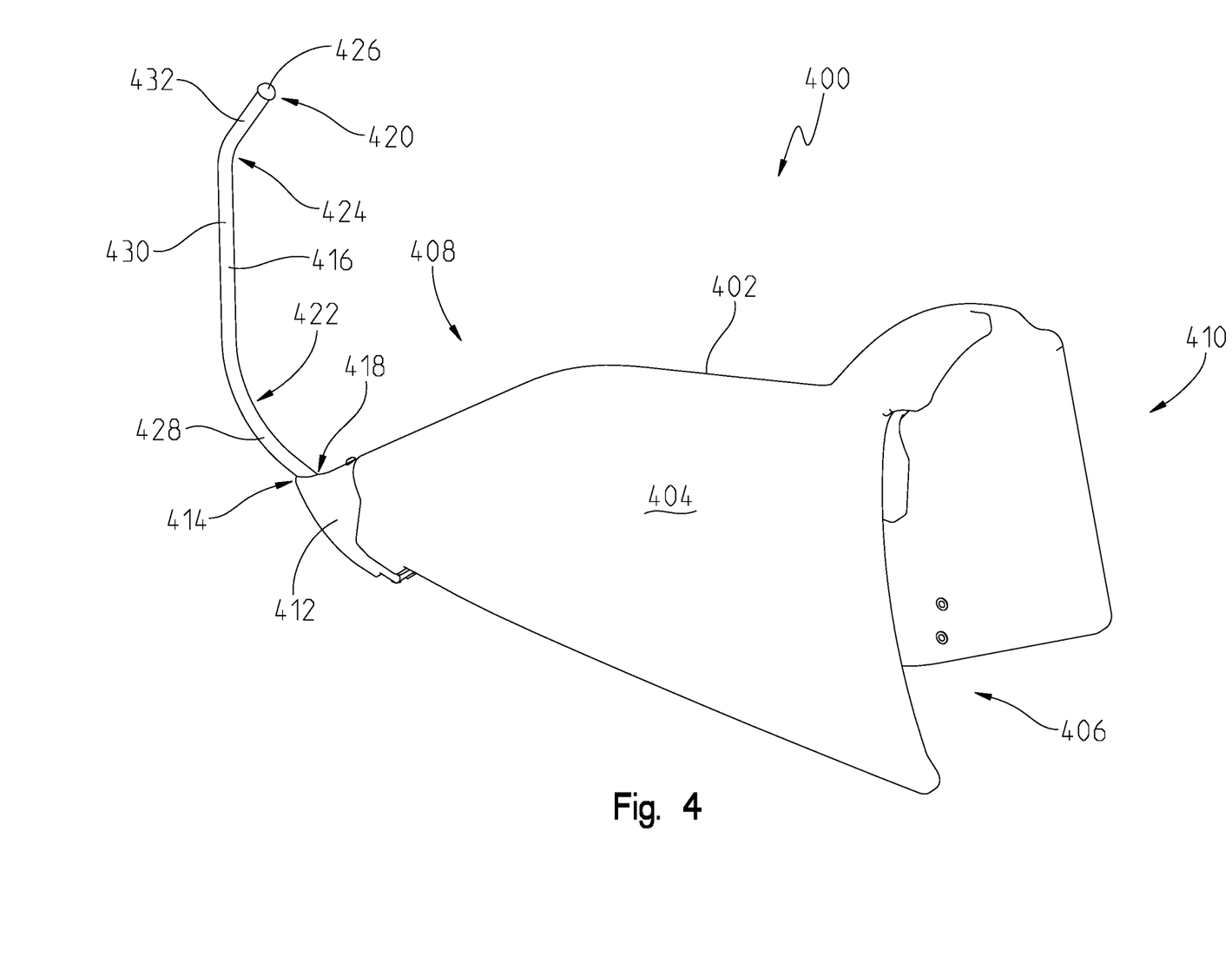
FIG. 4 is a partial perspective view of a crop row divider assembly with a crop divider rod and light-emitting mechanism.
Figure 5:
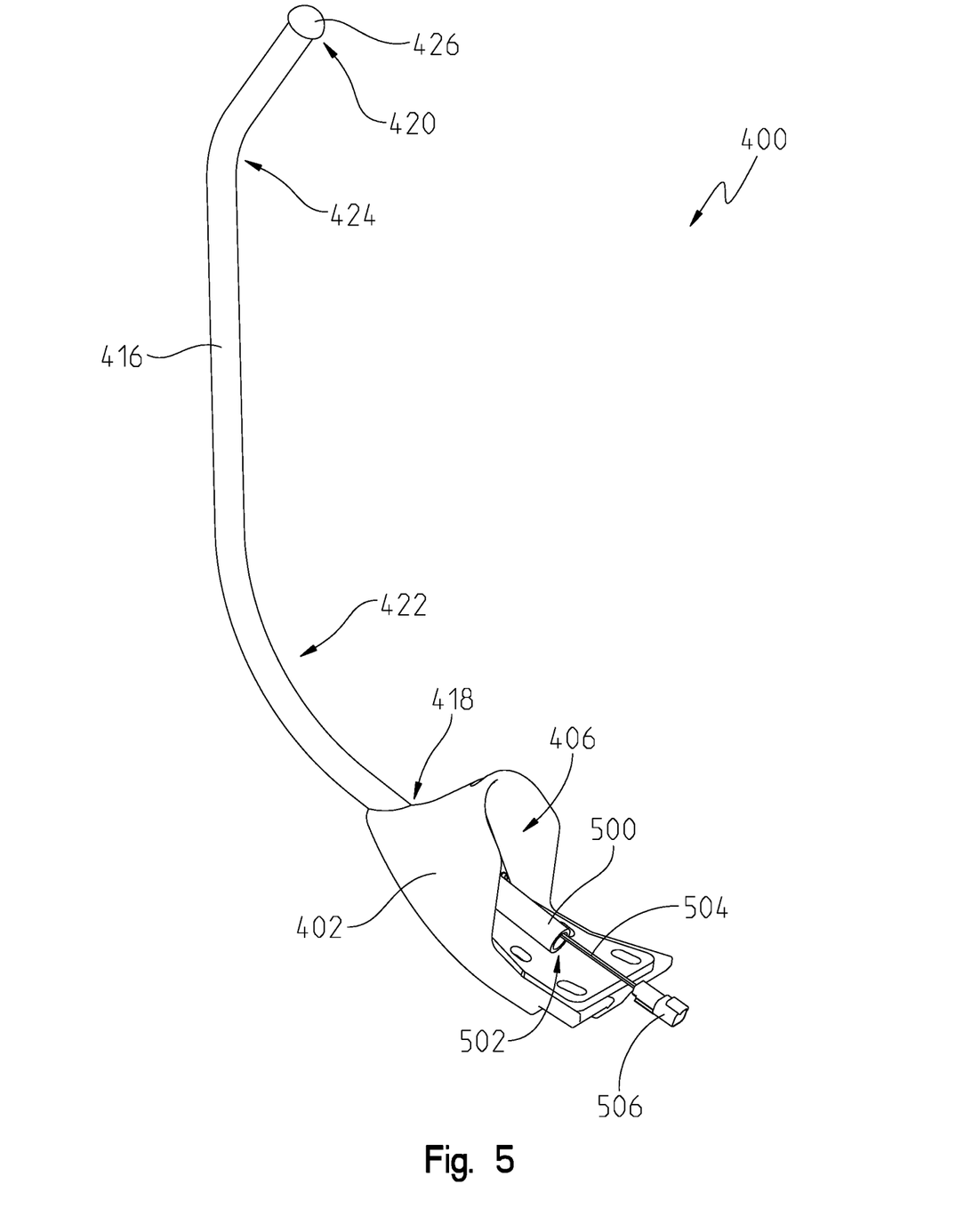
FIG. 5 is a partial perspective view of an interior of the crop divider assembly of FIG. 4.

Referring to FIGS. 4 and 5, another embodiment of a crop divider assembly 400 is shown. The crop divider assembly 400 may include an outer housing 402 or cover. The housing 402 may be formed by an outer surface 404 that promotes guiding crop inwardly towards a cutting mechanism to be severed and harvested. The housing 402 may further define an interior cavity 406 that may at least partially cover a conventional drive mechanism (not shown) for operably driving the cutting mechanism.

The housing 402 includes a front end 408 and a rear end 410. The housing 402 may be coupled to a frame of a harvesting header at or near its rear end 410. At the front end 408 of the housing 402, a divider shoe 412 may be coupled. The divider shoe 412 may be coupled to the housing 402 via a compression fit without the use of any fastener. Alternatively, it may be adhered or welded thereto. Moreover, it may be possible to use mechanical fasteners to couple the shoe 412 to the housing 402. In any event, the divider shoe 412 may be coupled to the housing 402 in any known manner.

The divider shoe 412 may further define a forwardmost tip 414 or edge of the crop divider assembly 400. At the forwardmost tip 414, a divider rod 416 may be coupled to the housing 402. The divider rod 416 may be an elongated tube having a hollow channel defined therethrough. In FIG. 4, the rod 416 includes a first end 418 and a second end 420. The first end 418 may be coupled to the housing 402 or shoe 412 at the forwardmost tip 414. The first end 418 of the divider rod 416, however, may not be the actual end thereof. As shown in FIG. 5, the divider rod 416 may extend into the interior cavity 406 of the housing 402. As a result, the divider rod 416 may include a portion 500 of which is at least partially enclosed or covered by the housing 402. The remaining portion of the divider rod 416, i.e., defined between the first end 418 and the second end 420, is located externally from the housing 402.

In FIG. 4, the divider rod 416 may project forwardly from the forwardmost tip 414. Further, the rod 416 may extend upwardly for the entirety of its length between the first end 418 and the second end 420. The divider rod 416 may not be entirely straight, however, between the first and second ends. In FIG. 4, for example, the divider rod 416 may include a first bend 422 and a second bend 424 defined between the first and second ends. In particular, a first section 428 of the divider rod 416 may project from the first end 418 to the first bend 422. As it does, it may extend at an angle in a forward and upward direction. A second section 430 of the divider rod 416 may be defined between the first bend 422 and the second bend 424. Here, the second section 430 extends largely in the upward or vertical direction, as shown in FIG. 4. A third section 432 of the divider rod 416 may be defined between the second bend 424 and the second end 420. The third section 432 of the divider rod 416 may be shorter than the first and second sections. The second section 430 may be the longest of the three sections. The third section 432 may extend from the second bend 424 in an upward and rearward direction, as shown in FIG. 4.

While the different sections of the divider rod are described with respect to the embodiment in FIG. 4, it is to be understood that different designs of divider rods may be used. A divider rod having only one section may be used in one example. A divider rod having only two sections may also be used. Further, a divider rod having four or more sections may be used. Thus, the design of the divider rod may vary depending upon the embodiment.

In the embodiment of FIGS. 4 and 5, a light-emitting mechanism 426 is located at the second end 420 of the divider rod 416. The light-emitting mechanism 426 may be similar to the light-emitting mechanism 314 of FIG. 3. Here, the light-emitting mechanism 426 may be angularly oriented in an upward and rearward direction so that an operator in a cab of an agricultural machine may see it while harvesting crop. When assembled, the light-emitting mechanism 426 may be positioned above the shoe 412 or forwardmost tip 414 of the divider assembly 400. In other instances, it may be located rearward of the forwardmost tip 414. In yet another example, the light-emitting mechanism 426 may be located forward of the forwardmost tip 414.

The light-emitting mechanism 426 may be positioned at a height of at least 6-12 inches from the forwardmost tip 414. In another example, the light-emitting mechanism 426 may be positioned at a height of at least 1-2 feet above the forwardmost tip 414. In yet another example, light-emitting mechanism 426 may be positioned at a height of at least two or more feet above the forwardmost tip 414. In yet a further example, the light-emitting mechanism 426 may be positioned at a height that puts it above the reel when viewed from the cab.

A power source (not shown) may provide electrical power to operate the light-emitting mechanism 426. For example, as shown in FIG. 5, an electrical wire or cable 504 may pass through a channel opening 502 formed in the divider rod 416 and electrically couple to the light-emitting mechanism 426. At an opposite end of the wire or cable 504 is a connector 506 for coupling to the power source directly or to another cable that is coupled to the power source. In one example, the connector 506 may be coupled to a wiring harness or the like for transferring electrical power to the light-emitting mechanism 426. Other possible arrangements may be used for transferring electrical power to the light-emitting mechanism 426.

In an alternative embodiment, the divider rod 416 may be coupled to the crop divider housing at a location underneath it, rather than being partially disposed within the interior cavity as described above. Here, the divider rod 416 may be coupled by a plurality of fasteners or the like below the tip edge of the crop divider assembly. In one example, the divider rod may be fixedly coupled. In another example, the divider rod may be pivotally coupled thereto. In a further example, the divider rod may be removably coupled. In yet another example, the divider rod may be integrally coupled with the housing at a location below the crop divider assembly. The divider rod may be coupled in other known ways as well.

While exemplary embodiments incorporating the principles of the present disclosure have been described herein, the present disclosure is not limited to such embodiments. Instead, this application is intended to cover any variations, uses, or adaptations of the disclosure using its general principles. Further, this application is intended to cover such departures from the present disclosure as come within known or customary practice in the art to which this disclosure pertains.

The invention claimed is:

1. A crop divider assembly for a harvesting header, comprising:
   a housing defining an interior cavity, the housing comprising a forwardmost end;
   a divider rod configured to engage crop and comprising a first end and a second end, the first end being coupled to the forwardmost end of the housing; and
   a light-emitting mechanism coupled to the second end of the divider rod;
   wherein, the divider rod extends upwardly from the forwardmost end;
   further wherein, the light-emitting mechanism is positioned at a location above the forwardmost end of the housing and is angularly oriented in a partially upward and rearward direction.

2. The assembly of claim 1, wherein the divider rod comprises a first portion and a second portion, the first portion being located outside of the interior cavity and the second portion being located inside the interior cavity.

3. The assembly of claim 2, wherein the first portion comprises a length defined between the first end and the second end.

4. The assembly of claim 2, wherein the divider rod comprises a hollow tube.

5. The assembly of claim 4, further comprising an electrical wire and an electrical connector, the electrical wire being coupled between the light-emitting mechanism and the electrical connector for transmitting electricity to the light-emitting mechanism;
   wherein the electrical wire is disposed within the hollow tube.

6. The assembly of claim 1, wherein the divider rod comprises an elongated tube including a first section, a second section, a third section, a first bend, and a second bend;
   wherein, the first section is defined between the first end and the first bend, the first section extending in a forward and upward direction;
   wherein, the second section is defined between the first bend and the second bend, the second section extending in a generally upward direction;
   wherein, the third section is defined between the second bend and the second end, the third section extending in a rearward and upward direction.

7. The assembly of claim 1, wherein the light-emitting mechanism comprises a bulb or light-emitting diode for emitting a blue, red, or green light.

8. The assembly of claim 1, wherein the light-emitting mechanism is located approximately one meter or less above the forwardmost end.

9. A harvesting header for mounting to a combine, comprising:
   a frame having a first end and a second end, the frame comprising a lateral width defined between the first end and the second;
   a cutting mechanism for severing crop, the cutting mechanism coupled to the frame;
   a crop divider assembly coupled at the first end of the frame, the crop divider assembly comprising a housing defining an interior cavity, the housing including a forwardmost end;
   a divider rod comprising a first end and a second end, the first end being coupled to the forwardmost end of the housing; and
   a light-emitting mechanism coupled to the second end of the divider rod and positioned outside the interior cavity;
   wherein, the divider rod extends upwardly from the forwardmost end;
   further wherein, the light-emitting mechanism is positioned at a location above the forwardmost end of the housing, and is angularly oriented in a partially upward and rearward direction.

10. The harvesting header of claim 9, wherein the divider rod comprises a first portion and a second portion, the first portion being located outside of the interior cavity and the second portion being located inside the interior cavity.

11. The harvesting header of claim 10, wherein the first portion comprises a length defined between the first end and the second end.

12. The harvesting header of claim 10, wherein the divider rod comprises a hollow tube.

13. The harvesting header of claim 12, further comprising an electrical wire and an electrical connector, the electrical wire being coupled between the light-emitting mechanism and the electrical connector for transmitting electricity to the light-emitting mechanism;
    wherein the electrical wire is disposed within the hollow tube.

14. The harvesting header of claim 9, further comprising a second crop divider assembly coupled at the second end of the frame, the second crop divider assembly comprising a housing defining an interior cavity and including a forwardmost end;
    a second divider rod comprising a first end and a second end, the first end being coupled to the forwardmost end of the housing of the second crop divider assembly; and
    a second light-emitting mechanism coupled to the second end of the second divider rod;
    wherein, the second divider rod extends upwardly from the forwardmost end;
    further wherein, the light-emitting mechanism is positioned at a location above the forwardmost end of the housing.

15. The harvesting header of claim 14, wherein the second light-emitting mechanism is oriented in an upward and rearward direction.

16. An agricultural machine for harvesting crop, comprising:
- a chassis;
- a ground-engaging mechanism for supporting the chassis and for propelling the machine along a ground surface;
- a cab mounted to the chassis, the cab including at least one control device for controlling the machine;
- a harvesting header mounted to a front end of the chassis, the harvesting header including a frame having a lateral width defined between a first lateral end and a second lateral end;
- a reel rotatably coupled to the frame for collecting severed crop;
- a crop divider assembly coupled at the first lateral end of the frame, the crop divider assembly comprising a housing defining an interior cavity, the housing including a forwardmost end;
- a divider rod comprising a first end and a second end, the first end being coupled to the forwardmost end of the housing, wherein the divider rod extends upwardly from the forwardmost end; and
- a light-emitting mechanism coupled to the second end of the divider rod and positioned outside the interior cavity;
- wherein, the light-emitting mechanism is positioned at a location above the forwardmost end of the housing, and is angularly oriented in a partially upward and rearward direction.

17. The agricultural machine of claim 16, wherein the light-emitting mechanism is positioned at a location visible from the cab without being obstructed by the reel.

18. The agricultural machine of claim 16, further comprising a second crop divider assembly coupled at the second end of the frame, the second crop divider assembly comprising a housing defining an interior cavity and including a forwardmost end;
- a second divider rod comprising a first end and a second end, the first end being coupled to the forwardmost end of the housing of the second crop divider assembly; and
- a second light-emitting mechanism coupled to the second end of the second divider rod;
- wherein, the second divider rod extends upwardly from the forwardmost end;
- further wherein, the second light-emitting mechanism is positioned at a location above the forwardmost end of the housing.

* * * * *